(12) United States Patent
Ström et al.

(10) Patent No.: US 11,506,286 B2
(45) Date of Patent: Nov. 22, 2022

(54) SEAL AND A TUBULAR HEAT EXCHANGER USING SUCH SEAL

(71) Applicant: Tetra Laval Holdings & Finance S.A., Pully (CH)

(72) Inventors: Pär Ström, Bjärred (SE); Magnus Gullberg, Malmö (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 213 days.

(21) Appl. No.: 16/955,836

(22) PCT Filed: Dec. 18, 2018

(86) PCT No.: PCT/EP2018/085512
§ 371 (c)(1),
(2) Date: Jun. 19, 2020

(87) PCT Pub. No.: WO2019/121692
PCT Pub. Date: Jun. 27, 2019

(65) Prior Publication Data
US 2021/0018279 A1   Jan. 21, 2021

(30) Foreign Application Priority Data

Dec. 20, 2017 (EP) .................................... 17208922

(51) Int. Cl.
*F16J 15/02* (2006.01)
*F16J 15/10* (2006.01)
(Continued)

(52) U.S. Cl.
CPC ........... *F16J 15/025* (2013.01); *F16J 15/024* (2013.01); *F16J 15/104* (2013.01); *F16J 15/106* (2013.01);
(Continued)

(58) Field of Classification Search
CPC ........ F16J 15/022; F16J 15/024; F16J 15/025; F16J 15/104; F16J 15/106; F16L 23/18; F16L 23/22; F28F 1/00; F28F 2230/00
See application file for complete search history.

(56) References Cited

U.S. PATENT DOCUMENTS 3,768,819 A * 10/1973 Burkert .................. F16J 15/328
277/647
4,114,908 A * 9/1978 Nicholson ............ F16J 15/0881
277/612
(Continued)

FOREIGN PATENT DOCUMENTS

CN       101010554 A       8/2007
CN       101929546 A      12/2010
(Continued)

OTHER PUBLICATIONS

International Search Report for corresponding Application No. PCT/EP2018/085512, dated Mar. 15, 2019.
(Continued)

*Primary Examiner* — Nicholas L Foster
(74) *Attorney, Agent, or Firm* — Renner, Otto, Bolsselle & Sklar, LLP

(57) ABSTRACT

A seal including a first portion having a first width that extends in a radial direction of the seal, a second portion that is joined with the first portion and having a second width that is smaller than the first width, and a first recess that is located in the first portion to reduce a width expansion of the first portion when the seal is compressed in an axial direction of the seal.

11 Claims, 4 Drawing Sheets

(51) Int. Cl.
*F28F 1/00* (2006.01)
*F16L 23/18* (2006.01)
*F16L 23/22* (2006.01)

(52) U.S. Cl.
CPC ............... *F16L 23/18* (2013.01); *F16L 23/22* (2013.01); *F28F 1/00* (2013.01); *F28F 2230/00* (2013.01)

(56) References Cited

U.S. PATENT DOCUMENTS

| | | | | |
|---|---|---|---|---|
| 4,934,715 | A * | 6/1990 | Johnson | ................... E02D 29/14 |
| | | | | 277/648 |
| 6,039,319 | A * | 3/2000 | Coonce | ................... F16L 23/22 |
| | | | | 277/318 |
| 7,975,870 | B2 | 7/2011 | Laule | ................... B60K 15/077 |
| | | | | 220/582 |
| 8,596,646 | B2 * | 12/2013 | Pradelle | ............... B29C 33/005 |
| | | | | 277/626 |
| 10,234,208 | B2 * | 3/2019 | Löfdahl | ............... F28D 7/0066 |
| 10,865,880 | B2 * | 12/2020 | Mackel | ................... F16J 15/062 |
| 2004/0239047 | A1 * | 12/2004 | Kent | ................... F16J 15/3236 |
| | | | | 277/628 |
| 2008/0277879 | A1 * | 11/2008 | Pradelle | ............. B29C 45/0025 |
| | | | | 277/316 |
| 2009/0058015 | A1 * | 3/2009 | Laule | ...................... F16J 15/106 |
| | | | | 277/591 |
| 2015/0308754 | A1 * | 10/2015 | Gautier | ............... F28D 21/0003 |
| | | | | 165/177 |
| 2015/0362257 | A1 * | 12/2015 | Löfdahl | .................. F28D 7/103 |
| | | | | 165/173 |
| 2019/0049015 | A1 | 2/2019 | Mackel | |

FOREIGN PATENT DOCUMENTS

| | | |
|---|---|---|
| DE | 4302251 A1 | 8/1993 |
| DE | 103 11 529 B3 | 9/2004 |
| DE | 102013005806 A1 | 10/2014 |
| DE | 10 2016 105047 A1 | 9/2017 |
| EP | 3 078 907 A2 | 10/2016 |
| EP | 2899434 A1 | 7/2019 |
| JP | H10267141 A | 10/1998 |
| JP | 5240594 B1 | 7/2013 |
| WO | 01/14779 A1 | 3/2001 |

OTHER PUBLICATIONS

Extended European Search Report for corresponding Application No. 17208922.9, dated Jul. 3, 2018.

* cited by examiner

SEAL AND A TUBULAR HEAT EXCHANGER USING SUCH SEAL

TECHNICAL FIELD

The invention generally relates to seals and tubular heat exchangers using such seals. More particularly, it is related to seals and tubular heat exchangers arranged to meet strict hygienic requirements for liquid food processing applications.

BACKGROUND ART

Tubular heat exchangers are used in different fields of the food processing industry. For instance, it is a common approach to use tubular heat exchangers for heat treating milk, in particular UHT (Ultra-High Temperature) milk. One reason for this is that a general structure of tubular heat exchangers allows for longer running times compared to e.g. plate heat exchangers. This is due to, for instance, that the general structure of tubular heat exchangers provides for that these are less affected by fouling than plate heat exchangers. Another advantage with tubular heat exchangers is that they can be used regeneratively, that is, having cold incoming milk in one section and heated milk that shall be cooled entering another section, such that a heat exchange can take place, resulting in that the incoming milk is heated and the outgoing, heat treated milk is cooled down, which in turn provides for a high energy efficiency. Still an advantage with using tubular heat exchangers in food processing applications is that food products with e.g. fibers can be processed efficiently. The reason for this is that the structure of the tubular heat exchanger provides for a product flow with few narrow passages compared to e.g. a plate heat exchanger.

Even though an overall structure of the tubular heat exchanger provides many advantages, these can only be achieved if different components of the tubular heat exchangers meet high standards. Put differently, in order to be able to guarantee a certain running time for a particular product, all components of the heat exchanger must meet the required standards on reliability and quality.

Some of several components in the tubular heat exchangers are seals. The seals should be made in materials that can withstand the chemical and physical stress caused by pressure, the product itself, interaction with components with which the seals are attached and so forth. In addition, in food processing applications, the seals should not release harmful substances or be torn apart such that parts of the seals end up in the food product passing through the heat exchanger.

The seals used today in tubular heat exchangers are food safe and most often do not cause much unwanted interruptions of production. However, in order to further reduce any potential interruption, there is a need for improved seals to be used in tubular heat exchangers, aiming for improving overall operation of the tubular heat exchangers further.

SUMMARY

It is an object of the invention to at least partly achieve an improvement of the above-identified prior art. In particular, it is an object to provide a seal for a tubular heat exchanger that can provide long running times.

According to a first aspect it is provided a seal comprising a first portion having a first width that extends in a radial direction of the seal, a second portion (204) that is joined with the first portion and having a second width that is smaller than the first width, and a first recess that is located in the first portion to reduce a width expansion of the first portion when the seal is compressed in an axial direction of the seal.

The seal may comprise in sequence, an upper side section, an outer side section, a first lower side section, a first inner side section, a second lower side section and a second inner side section joining the upper side section and configured to face a product when the seal is arranged to provide sealing between two components, wherein the first recess forms a recess in the upper side section.

Further, the seal may comprise a first protrusion that is arranged on the upper side section.

In addition, the seal may comprise a second protrusion that is arranged on the upper side section, at a location further away from the second inner side section than the first protrusion.

The seal may further comprise a second recess that is located in the first portion to form a recess in the upper side section.

Moreover, the seal may comprise a third recess that is located in the first and second portions to form a recess in the outer side section.

Additionally, the seal may comprise a chamfered surface that joins the first lower side section and the first inner side section.

Further, the seal may comprise a first flat section that is arranged on the outer side section, at a location where the upper side section joins the outer side section.

In addition, the second protrusion may extend above the first protrusion in the axial direction.

The seal may also comprise a second flat section that is arranged on the first lower side section, at a location where the outer side section joins the lower side section. The second flat section may have a length that is half of a length of the first lower side section. The second recess may have a length that is half of a length of the upper side section. The length of the second flat section may be shorter than the length of the second recess.

The seal may be a hygienic seal for food processing applications.

According to a second aspect it is provided a tubular heat exchanger comprising a seal according to the first aspect.

The seal may be arranged with the second inner side section facing a product flow channel.

The seal may be arranged between a first element and a second element of the tubular heat exchanger, the second element comprises a recess, and the second portion of the seal is located in the recess of the second element.

The first element may comprise a tube package and the second element may be a flange.

Still other objectives, features, aspects and advantages of the invention will appear from the following detailed description as well as from the drawings.

BRIEF DESCRIPTION OF THE DRAWINGS

Embodiments of the invention will now be described, by way of example, with reference to the accompanying schematic drawings, in which.

DETAILED DESCRIPTION

Figure 1:
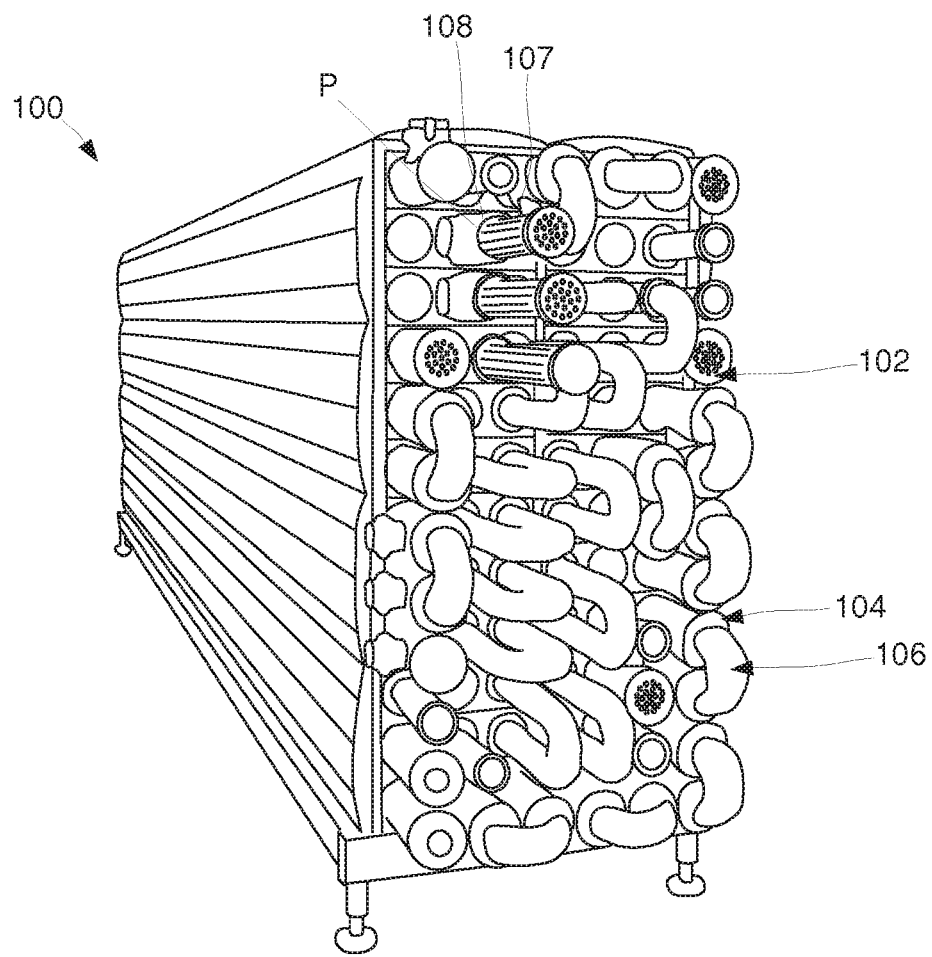
FIG. 1 is a perspective view of a tubular heat exchanger.

With reference to FIG. 1 a tubular heat exchanger 100 is illustrated. The tubular heat exchanger 100 is a well-known piece of equipment for processing a liquid food product. The tubular heat exchanger 100 is provided with inner pipes 107 running inside an outer pipe 108 that form a shell for the inner pipes 107. Generally the liquid food product is held inside the inner pipes and hot water or any other heat transfer medium is held on a shell side, i.e. in a space surrounding the inner pipes. However, in case the tubular heat exchanger is run regeneratively incoming product can be held inside the inner pipes and outgoing product may be held outside the inner pipes on the shell side.

In some tubular heat exchangers a number of inner pipes are grouped in a tube package 102. An advantage of this modular approach is that the tubular heat exchanger 100 can easily be adapted in order to meet specific demands of a particular product. In order to keep the inner pipes in place, supports may be used. Another option is to apply a strain on the inner pipes by using a spring battery such that a tension is formed that keeps the inner pipes in place in the vertical direction.

In order to connect different inner tubes to each other, the tube package 102 can be connected via a flange 104 to a bent pipe 106 such that the food product held in the inner pipes can be sent back and forth in the tubular heat exchanger until desired heat treatment has been achieved. Between the tube package 102 and the flange 104 a seal can be placed in order to assure a tight fit between the two.

Figure 2A:
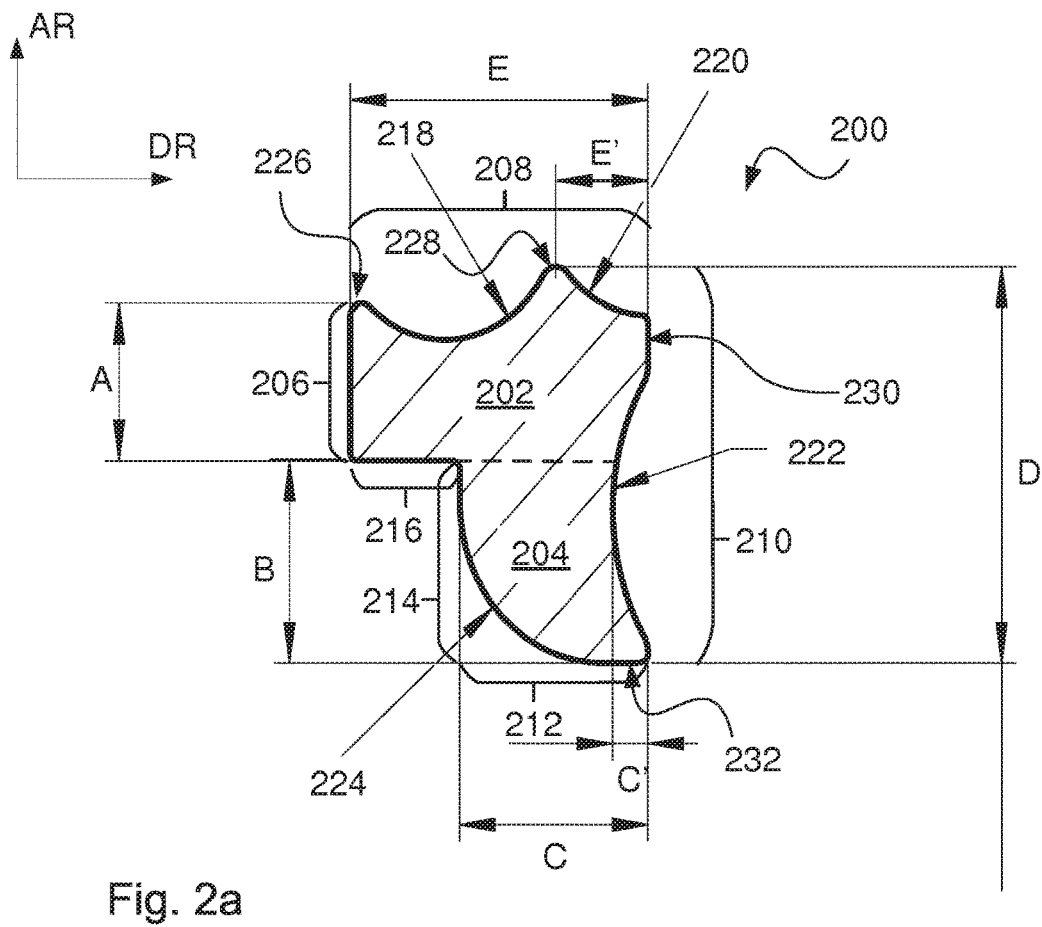
FIG. 2a is a cross-sectional view of a seal according to a first embodiment.
Figure 2B:
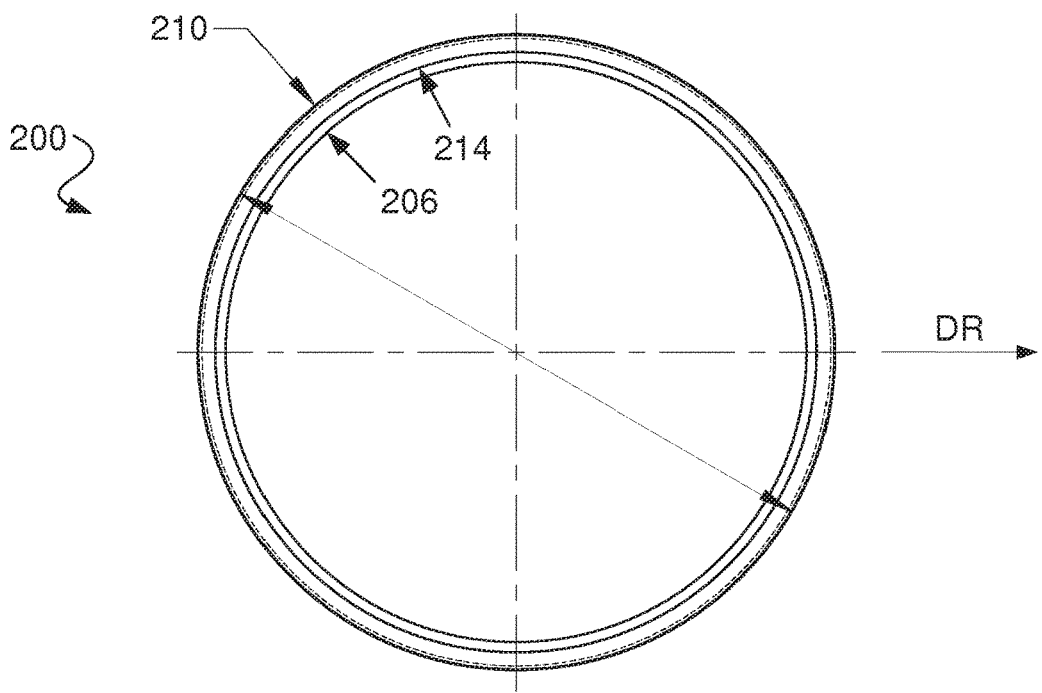
FIG. 2b is a top view of the seal according to the first embodiment.

FIG. 2a illustrates a cross-sectional view of a seal 200 according to a first embodiment that may be used for providing the tight fit between the tube package 102 and the flange 104, or between other components of the tubular heat exchanger 100. FIG. 2b illustrates the seal 200 seen from above.

The seal 200 has a ring-shaped form, and thus defines a radial direction DR and an axial direction AR. Generally, the seal 200 can comprise a first portion 202 arranged to be placed between the tube package 102 and the flange 104, and a second portion 204 arranged to be placed in a recess in, for example, the flange 104. As illustrated in FIG. 2, the first portion 202 may be provided with a first width E that is smaller than a width C of the second portion 204. Even though referring to the first portion 202 and the second portion 204 of the seal 200, it should be noted that this is made for illustrative purposes, and the seal 200 is typically be made in one piece, from any conventional material that suitable to be used in food processing applications. Herein, a "width" generally extends in the radial direction DR, while a "height" generally extends in the axial direction AR.

More in detail, the seal 200 can comprise, in sequence, an upper side section 208, an outer side section 210, a first lower side section 212, a first inner side section 214, a second lower side section 216 and a second inner side section 206 joining the upper side section 208. When being installed between the tube package 102 and the flange 104, the second inner side section 206 is arranged to face a product provided in a product channel P (see FIGS. 1 and 4 for product channel P). Herein, an "upper side" generally refers to a side that is opposite "a lower side". An "outer side" generally refers to a side that is opposite an "inner side". The "outer side" is typically further out in the radial direction compared to the "inner side", at least for all sides that are located at the same axial height.

During operation, the seal 200 can be exposed to pressure from the product, and in particular to pressure from the tube package 102 and the flange 104, or any other two components between which the seal 200 is clamped. In addition to being exposed to pressure, the seal 200 may due to interaction with the product swell, which in turn affect the seal 200. Further, due to temperature increases or decreases, the seal 200 may expand or contract, which in turn will also affect the seal 200. In order to provide for that the seal 200 fulfils its purpose of providing a tight fit and is able to withstand affects caused by pressure, swelling, temperature variations etc. a first recess 218 is provided in the first section 202.

By having the first recess 218 it is made possible for the seal 200 to expand upwards, which has a positive effect in that a width expansion of the first section 202 can be reduced. This in turn provides for that a risk that the first section 202 is pushed into the product channel P can be reduced. Avoiding this is beneficial because if a part of the seal 200 is pushed into the product channel P there is a risk that the part of the seal 200 is torn off, which will reduce the seal's 200 capability to provide the tight fit and also provide a risk that the part of the seal 200 end up in a final food product.

Another disadvantage of having the seal 200 pushed into the product channel is that a risk that food residues accumulate easier. An interior of a product channel P is preferably designed to be smooth in order reduce the risk of having food residues accumulated.

In addition to the first recess 218, a second recess 220 may be placed in the upper side section 208. Further, the outer side section 210 may be provided with a third recess 222. This third recess 222 may, as illustrated, span over both the first and second portions 202, 204. Additionally, a chamfered surface 224 that joins the first lower side section 212 and the first inner side section 214 may be provided. These all contribute to reducing a width expansion of the first portion 202.

To provide for that product from the product channel P is kept therein, a first protrusion 226 may be provided on the upper side section 208. By having the first protrusion 226 a risk that product comes into the first recess 218 can be reduced.

In order to provide a back-up for the first protrusion 226 as well as providing for that the seal 200 as a whole is securely fastened in order to provide the tight fit, a second protrusion 228 may be provided on the upper side section 206. As illustrated, the first protrusion 226 may be provided next to the second inner side section 206 and the second protrusion 228 may be placed at a location further away from the second inner side section 206 than the first protrusion 226, for instance, between the first recess 218 and the second recess 220.

Figure 4:
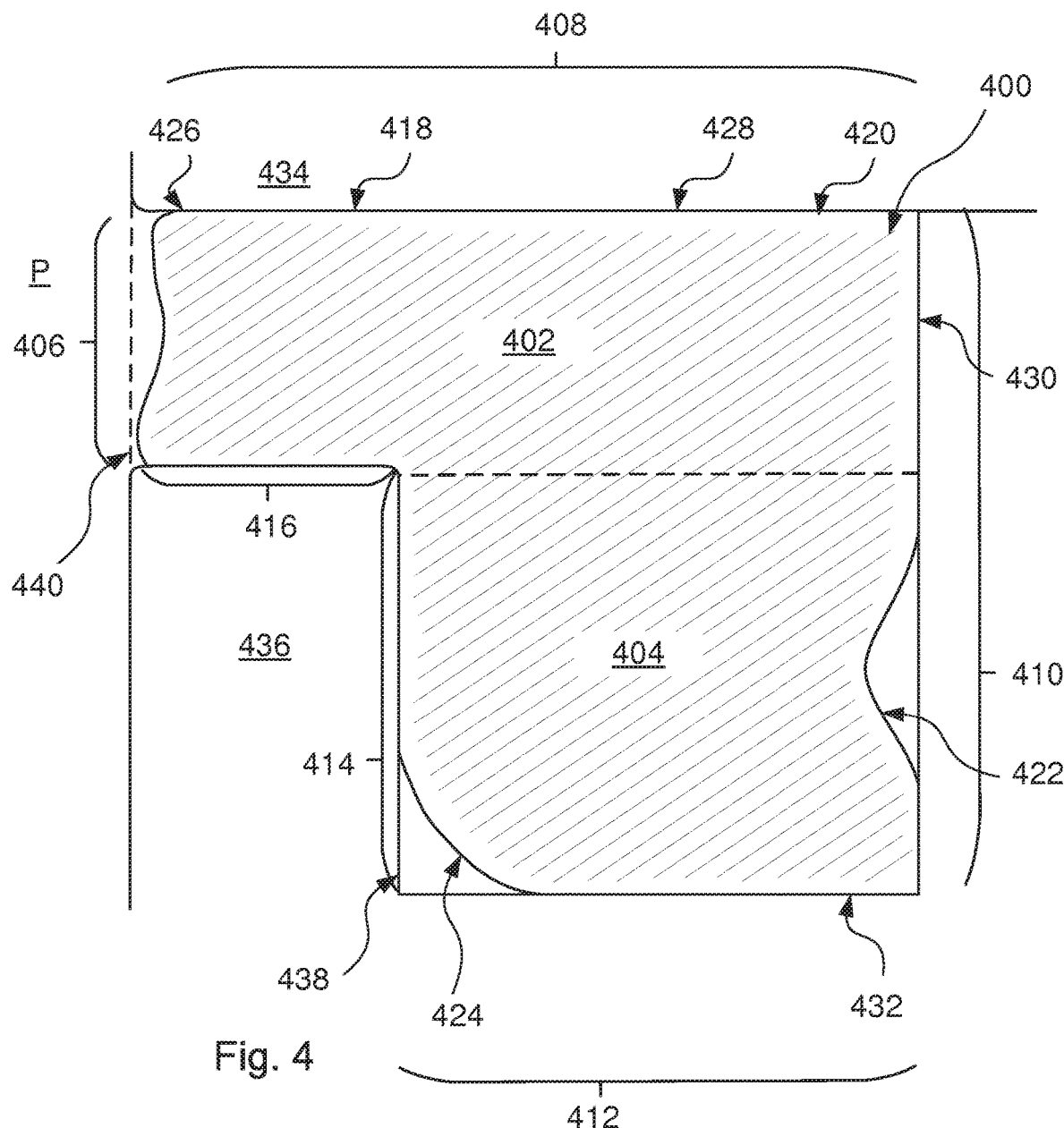
FIG. 4 is a cross-sectional view of a seal placed between a first and a second element.

In order to make sure that the tight fit is achieved when clamping the seal between a first and a second element 434, 436, as further illustrated in FIG. 4, for instance the tube package 102 and the flange 104, the seal 200 may be designed such that the second protrusion 228 protrudes above the first protrusion 226 in the axial direction AR. Put differently, a distance D extending between a lowest point of the first lower side section 212 and a top of the second protrusion 228 may be greater than a distance A that is a length (height) of the second inner side section 206, combined with a distance B, that is a length (height) of the first inner side section 214. By having the design of the seal 200 made in this way, a part of the seal 200 placed beneath the second protrusion 228 will be compressed before a part of the seal 200 placed beneath the first protrusion 226 is compressed when clamping the seal 200 between the first and second elements 434, 436. An advantage of this is that a controlled compression of the seal 200 can be achieved. More specifically, it is an advantage in that the second inner side section 206 can be less affected, which in turn provides for that a substantially flat surface of the second inner side section 206 can be achieved when the seal 200 is clamped between the first and second elements 434, 436, as illustrated in FIG. 4.

In order to assure that the seal 200 is correctly mounted before clamping the seal 200, a first flat section 230 may be provided at a location where the upper side section 208 joins the outer side section 210. In addition or alternatively, for the same purpose, a second flat section 232 may be provided on the first lower side section 212.

Further, in order to provide the tight fit, the second flat section 232 can have a length C' that is half of a length C of the first lower side section 212. The second recess 220 may have a length E' that is less than half of a length E of the upper side section 208. The length C' of the second flat section 232 may be shorter than the length E' of the second recess 220.

Figure 3A:
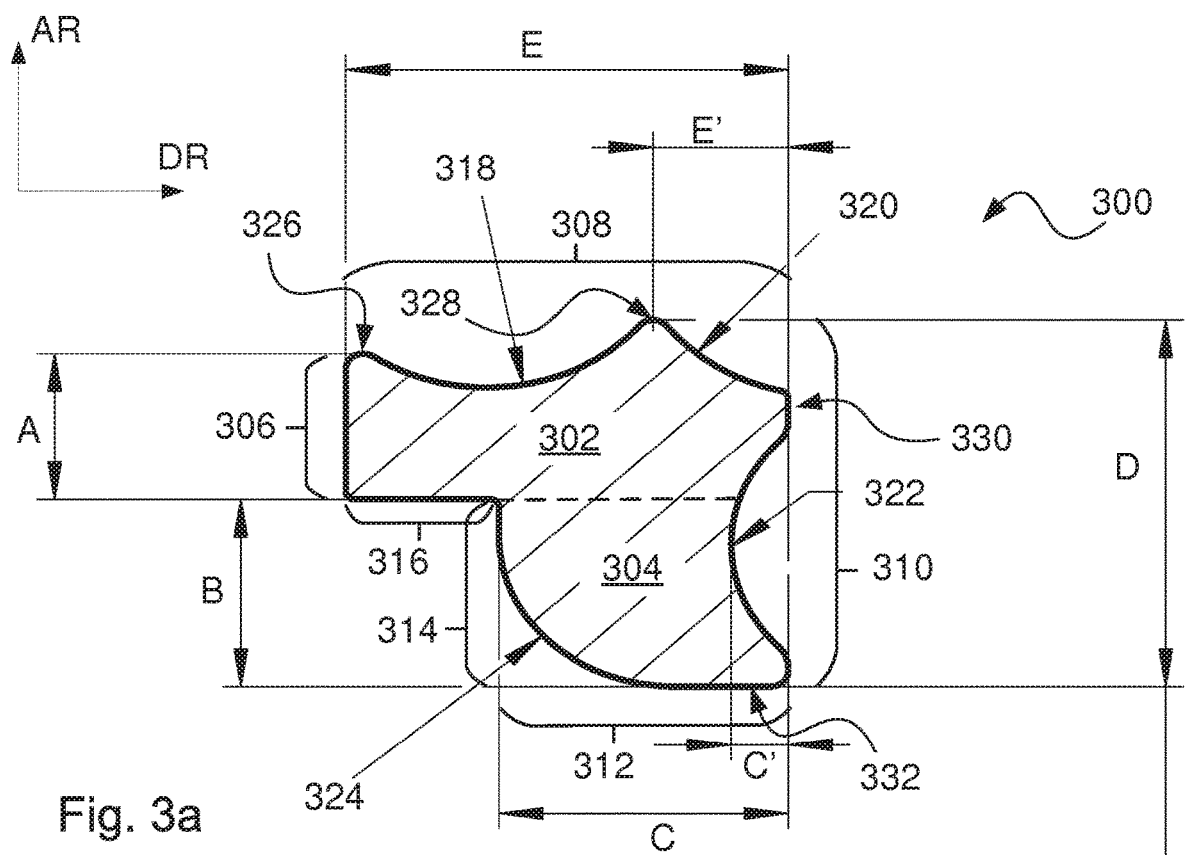
FIG. 3a is a cross-sectional view of a seal according to a second embodiment.
Figure 3B:
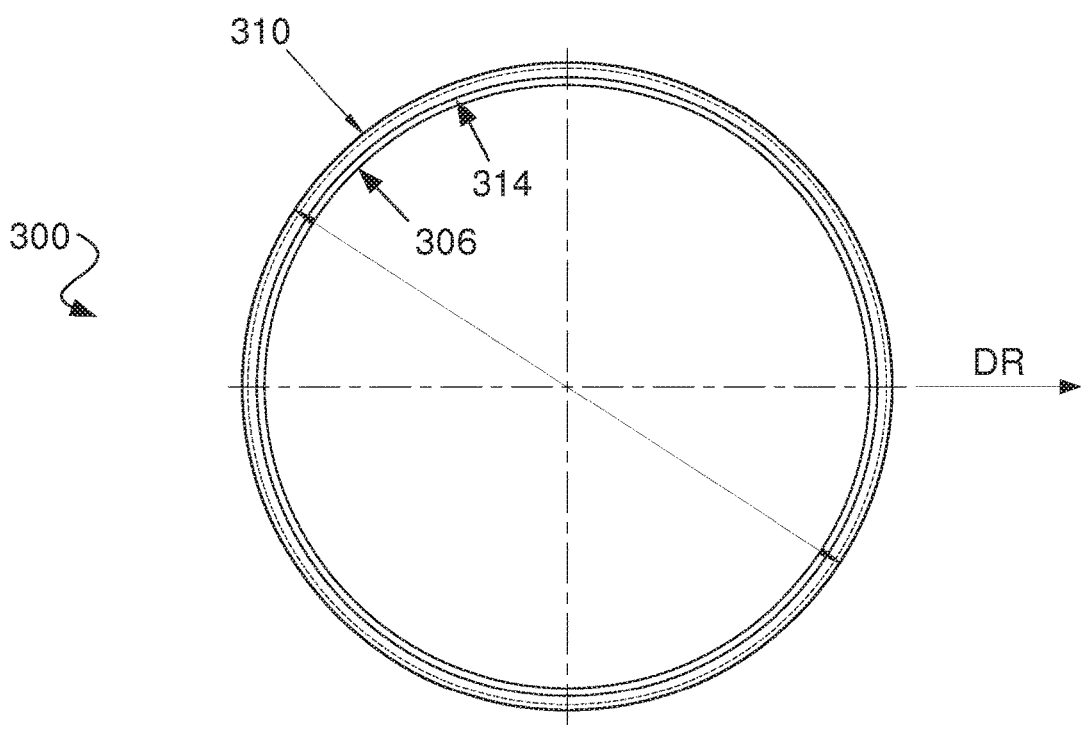
FIG. 3b is a top view of the seal according to the second embodiment.

FIG. 3a illustrates a cross-sectional view of a seal 300 and FIG. 3b illustrates the seal 300 seen from above according to a second embodiment that can also be used for providing the tight fit between the tube package 102 and the flange 104 as the first embodiment, but provided with a different geometry.

As the first embodiment illustrated in FIGS. 2a and 2b, the seal 300 can comprise a first and a second portion 302, 304, wherein the first portion 302 can have a width E that is greater than a width C of the second portion 304. Further, similar to the seal 200 illustrated in FIGS. 2a and 2b, the seal 300 can comprise, in sequence, an upper side section 308, an outer side section 310, a first lower side section 312, a first inner side section 314, a second lower side section 316 and a second inner side section 306 joining the upper side section 308.

Further, a first recess 318 can be provided in order to reduce a width expansion of the first portion 302, offering the same advantages as described with reference to FIGS. 2a and 2b. Also in line with FIGS. 2a and 2b, the seal 300 may be provided with a second recess 320, a third recess 322, a chamfered surface 324, a first protrusion 326, a second protrusion 328, a first flat section 330 and a second flat section 332.

FIG. 4 illustrates a cross-sectional view of a seal 400 placed in position between the first element 434 and the second element 436 of the tubular heat exchanger 100 by way of example. The seals 200, 300, 400 have the same principal shape and share the same features and associated advantages.

As the seals 200, 300 previously discussed, the seal 400 may comprise a first portion 402 and a second portion 404. The second portion 404 may be placed in a recess 438 of the second element 436.

Further, the seal 400 can comprise, in sequence, an upper side section 408, an outer side section 410, a first lower side section 412, a first inner side section 414, a second lower side section 416 and a second inner side section 406 joining the upper side section 408. In addition, a first recess 418 can be provided in order to reduce a width expansion of the first portion 402 as described above. Still further, the seal 400 may be provided with a second recess 420, a third recess 422, a chamfered surface 424, a first protrusion 426, a second protrusion 428, a first flat section 430 and a second flat section 432.

Unlike the seals 200, 300 illustrated in FIGS. 2a, 2b, 3a and 3b, the seal 400 illustrated in FIG. 4 is compressed, that is clamped between the first and second elements 434, 436 such that a deformation has occurred. When clamping the seal 200 in this way a geometry of the seal 400 is changed. For instance, as illustrated in FIG. 4, due to the pressure exerted by the first and second elements 434, 436 the first recess 418 may no longer be present. Similarly, the second recess 420 may no longer be present. In the example illustrated in FIG. 4, the third recess 422 is still present, but diminished. In a similar manner the chamfered surface 424 has been moved towards inner walls of the recess 438 due to the pressure exerted by the first and second elements 434, 436. The protrusions 418, 428 are flattened out.

When uncompressed, the seal 400 has the same principal shape as the seals 200, 330. The seals 200, 300 will be compressed just like the seal 400 when clamped between two components. In fact, the seals 300 and 400 are typically identical, i.e. FIG. 4 shows the seal 300 when compressed.

The second inner side section 406 can, as described above, face a product channel P. In order to provide for that food residues do not accumulate and result in food safety issues the notch in the product channel P caused by the seal 400 is preferably as shallow as possible. In the example illustrated in FIG. 4, it can be seen that a line 440 representing an extension of an inner wall of the product channel P does not coincide with the second inner side section 406, thus implying that there is an offset between the second inner side section 406 of the seal 400 and the inner wall of the product channel P. However, by being able to reduce the width expansion of the first portion 402 this offset may be made relatively small, which has the advantage that the risk of food residue accumulation can be held low and, as described above, in case the seal 400 is protruding into the product channel P, that the risk that the seal 400 is torn apart.

From the description above follows that, although various embodiments of the invention have been described and shown, the invention is not restricted thereto, but may also be embodied in other ways within the scope of the subject-matter defined in the following claims.

The invention claimed is:

1. A seal, comprising:
a first portion having a first width that extends in a radial direction of the seal,
a second portion that is joined with the first portion and having a second width that is smaller than the first width, and
a first recess that is located in the first portion to reduce a width expansion of the first portion when the seal is compressed in an axial direction of the seal, wherein the seal comprises in sequence,
an upper side section,
an outer side section,
a first lower side section,
a first inner side section,
a second lower side section, and
a second inner side section joining the upper side section and configured to face a product when the seal is arranged to provide sealing between two components, wherein:
the first recess forms a recess in the upper side section,
a first protrusion is arranged on the upper side section, a second protrusion is arranged on the upper side section, at a location further away from the second inner side section than the first protrusion, a second recess is located in the first portion to form a recess in the upper side section, the second protrusion extends above the first protrusion in the axial direction, and the first protrusion and the second protrusion are the only protrusions on the upper side section.

2. The seal according to claim 1, comprising a third recess that is located in the first and second portions to form a recess in the outer side section.

3. The seal according to claim 1, comprising a chamfered surface that joins the first lower side section and the first inner side section.

4. The seal according to claim 1, comprising a first flat section that is arranged on the outer side section, at a location where the upper side section joins the outer side section.

5. The seal according to claim 1, comprising a second flat section that is arranged on the first lower side section, at a location where the outer side section joins the lower side section, and has a length that is half of a length of the first lower side section.

6. The seal according to claim 1, wherein the seal is a hygienic seal for food processing applications.

7. A tubular heat exchanger comprising the seal according to claim 1.

8. The tubular heat exchanger according to claim 7, wherein the seal is arranged with the second inner side section facing a product flow channel of the tubular heat exchanger.

9. The tubular heat exchanger according to claim 7, wherein the seal is arranged between a first element and a second element of the tubular heat exchanger, the second element comprises a recess, and the second portion of the seal is located in the recess of the second element.

10. The tubular heat exchanger according to claim 7, wherein the first element comprises a tube package and the second element is a flange.

11. The seal according to claim 1, wherein the upper side section has only two recesses which are the first and second recesses, in which only one of the two recesses is between the first and second protrusions.

* * * * *